Patented Apr. 16, 1935

1,998,238

UNITED STATES PATENT OFFICE 1,998,238

METHOD OF CONTROLLING GROWTH OF
VEGETATION AND THE LIKE

Harry H. Howeth, Hurlock, Md.

No Drawing. Application September 5, 1933,
Serial No. 688,193

3 Claims. (Cl. 47—58)

This invention relates to the method of controlling the growth of vegetation and the like, and has for an object to provide the method whereby vegetable and like growths may be started at any convenient period and maintained against further growth until a selected time.

A further object of the invention is to provide the method of maintaining a vegetable unit or the like in a moist condition with light and air excluded, and at such a uniform temperature as to encourage root growth and discourage top growth.

A further object of the invention is the provision of a method whereby a vegetable unit is placed in a container together with such earthy matter as may be required for the growth of the vegetable unit, then sealing the vegetable unit and earth to exclude air and light, and then maintaining the completed unit at such uniform temperature as will encourage root growth and discourage top growth.

It is well known that vegetable growth, which is to be understood as including flowers, fungi and any type of growth ordinarily encouraged, depends upon light, moisture and temperature, all of these requisites varying with different growths.

Merely as illustrative of the present method, the treatment of a flower bulb will be described.

A container of any type is employed which, when closed, will retain moisture and exclude air and light. Earthy matter of the required nature is placed in this container and the bulb set into the earthy matter in the usual manner. The container is then closed. This may be hermetically sealed, or any such other manner as will effectively exclude the light and air. Under ordinary climatic conditions, the bulb so enclosed will be placed in a refrigerating chamber which will maintain the temperature at such uniformity as will prevent freezing the bulb, and at the same time encourage the root growth, and by reason of the temperature exclusion of air and light, discourage top growth.

As an example, and without limitation, it may be noted that a container partially filled with very rich earth, may be employed, and a bulb such, for instance, as a narcissus bulb, may be set into the earthy matter to be partially or entirely covered thereby. The container is then closed to exclude light and air, and the unit, thus completed will be maintained at a temperature at approximately 36° Fahrenheit. It may be maintained at this temperature for a very long time; ordinarily, however, it is only maintained such length of time that will force the blooming at some unusual season, and would, therefore, not extend over a great length of time, the time being dependent upon when the bloom is desired. When such bloom is desired, the unit is taken from the storage, at the temperature named, and placed in a room at usual or normal room temperatures which may be considered from 70° to 75° Fahrenheit. The closure is removed, admitting light and air, and the bulb having made considerable root growth during its colder time, produces vigorous growth and bloom at a very early time after such change of temperature.

When it is desired that the bulb shall bloom, the container is opened and placed in such temperature as is conducive to top growth and such light as is best suited to the purpose. The root growth having been already established, the top growth is almost immediate.

Such treatment is especially applicable to out of season blooming, as the bulbs may be started at any season and maintained for such length of time as may be found desirable, and until the blooming season or top growth season chosen has been reached.

While refrigeration is above referred to, it is to be understood that in cold climates, heat will be necessary rather than refrigeration, as it is necessary to maintain the bulb at such uniform temperature as will accomplish the result above outlined.

The reference to a bulb as above is merely by way of illustration, and it is to be understood that seeds and cuttings may be similarly treated. Any type of growth by whatever name the germ may be called is fully within the present invention.

The invention is also intended to cover the use of spawn for the growth of fungi, such for instance, as mushrooms. The growth may be discouraged until such time as the consumer may wish to produce the growth, then by the admission of air and the proper regulation of light and temperature, together with the necessary moisture, the mushroom growth will be almost immediate.

I claim:—

1. The method of controlling vegetable growth consisting in enclosing a vegetable unit devoid of top or root growth in earthy material in a portable container closed against the introduction of light and air and at a uniformly low temperature.

2. The method of controlling vegetable growth consisting in maintaining a vegetable unit devoid of top or root growth in earthy material in a portable container at a predetermined low temperature, such container excluding light and air and retaining moisture.

3. The method of controlling vegetable growth consisting in enclosing a vegetable unit substantially devoid of top or root growth in a portable container adapted to retain moisture and exclude air and light, said vegetable unit being installed in earthy material and all maintained at a uniform temperature tending to encourage root growth and discourage top growth.

HARRY H. HOWETH.